Feb. 24, 1953 — M. P. BUDNEY — 2,629,268
UNIVERSAL LOCATING DRILL PRESS CENTERING APPARATUS
Filed Nov. 13, 1951
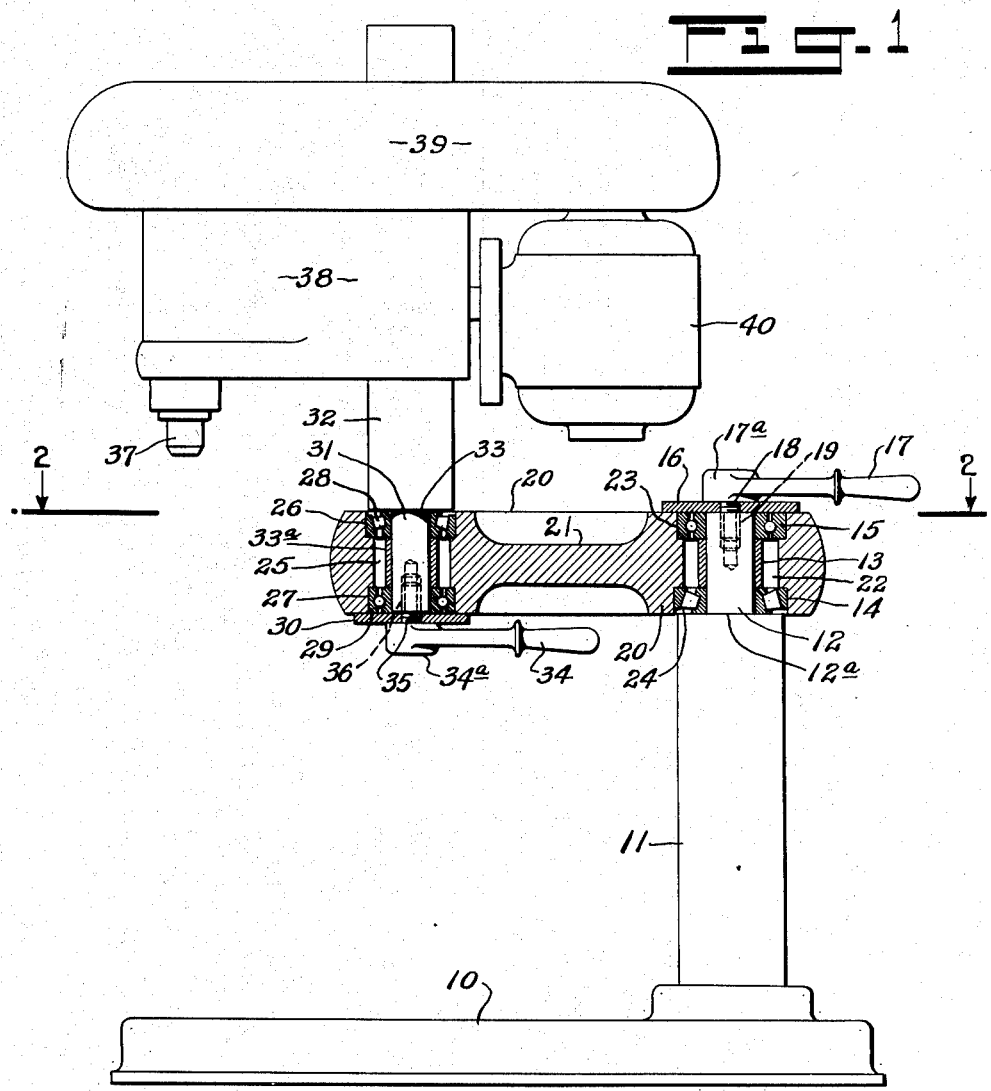
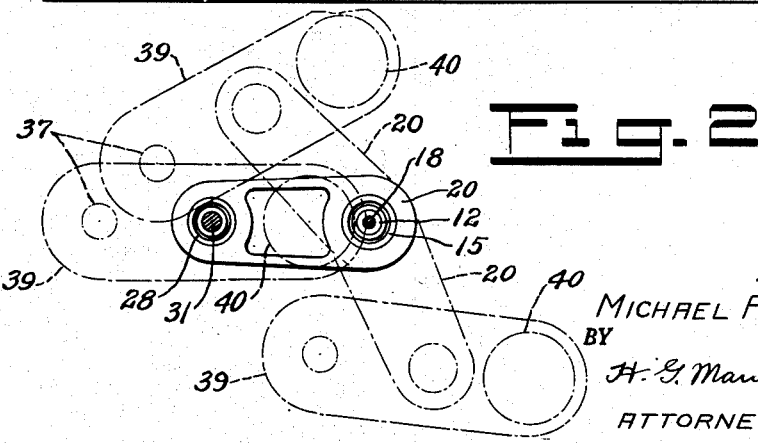
INVENTOR.
MICHAEL P. BUDNEY
BY H. G. Manning
ATTORNEY Patented Feb. 24, 1953

2,629,268

UNITED STATES PATENT OFFICE 2,629,268

UNIVERSAL LOCATING DRILL PRESS CENTERING APPARATUS

Michael P. Budney, Newington, Conn.

Application November 13, 1951, Serial No. 256,047

1 Claim. (Cl. 77—27)

This application relates to machine tools and more particularly to an apparatus for centering or universally locating a drill or other tool, with respect to the work upon a drill press base.

One object of the present invention is to facilitate the centering of a drill over more than the full range of 360° swing of the holding arm thereof.

A further object is to provide a device of the above nature which will be easy to handle, having a minimum of resistance to the manual turning of the swivel bracket, which is accomplished by means of anti-friction bearings.

A further object is to provide a machine of the above nature which will be inexpensive, and which will form a substitute for the more complicated and expensive radial drills.

A further object is to provide a machine of the above nature which will be relatively simple in construction, easy to install and manipulate, compact, ornamental in appearance, and very efficient and durable in use.

With these and other objects in view there has been illustrated on the accompanying drawing, one form in which the invention may conveniently be embodied in practice.

In the drawing:

Fig. 1 represents a side view, partly in section, of the universally locating drill press apparatus embodying the present invention.

Fig. 2 is a cross-sectional view of the same, on a smaller scale, looking downwardly, along the line 2—2 of Fig. 1, showing in dotted lines, three alternative positions of the swivel bracket and the over-head bracket, for universally supporting the drill head and motor.

Referring now to the drawing in which like reference numerals denote corresponding parts throughout the several views, the numeral 10 indicates generally the base of the drill press which is adapted to rest upon the floor or bench. Extending upwardly from the base 10 is a vertical column 11 having a reduced upper end 12 forming a shoulder 12a. Rigidly mounted upon the reduced upper end 12 of the column 11 is a roller thrust bearing 14 engaging the shoulder 12a. Provision is also made of a spacing collar 13 of reduced diameter resting upon the roller bearing 14, and above said collar 13 is a ball bearing 15.

Provision is made of a swivel bracket 20 having a cylindrical aperture 22 at its inner end provided with enlarged upper and lower ends 23, 24, for frictionally fitting over the outside of the upper ball bearing 15 and lower roller thrust bearing 14, respectively.

Upon the top of the ball bearing 15, provision is made of a washer plate 16 of larger diameter than the aperture 23, which plate 16 is adapted to be engaged by a hub 17a on the end of an elongated locking handle 17. The handle 17 is provided with an integral depending threaded shaft 18 which is adapted to be engaged within a tapped hole 19 in the reduced upper section 12 of the column 11.

By means of this construction it will be seen that by swinging the handle 17 clockwise, the swivel bracket 20 may be tightly clamped in any desired adjusted position upon the column 11.

The free end of the bracket 20 is also provided with a cylindrical aperture 25 having enlarged upper and lower end sections 26, 27 adapted to receive an upper roller thrust bearing 28 and a lower ball bearing 29, which bearings are frictionally fitted within said enlarged sections.

Between the ball bearing 29 and the roller bearing 28, provision is made of a spacing collar 33a of reduced diameter which is adapted to maintain the bearings in separated relationship.

Provision is also made of a vertical drill press upstanding column 32 having a reduced lower end 31 which is provided with a shoulder 33 against which the upper roller thrust bearing 28 is adapted to seat. The lower end of the reduced section 31 of the column 32 is provided with a tapped hole 36 for receiving a threaded shaft 35 which is integral with a horizontal handle 34 having a hub 34a for convenience in manipulation.

A washer plate 30, similar to the plate 16, is provided between the hub 34a and the swivel bracket 20. The handle 34 serves to lock the drill head 38 in any desired adjusted position with respect to the swivel bracket 20.

On the top of the drill head 38, provision is made of an overhead cover 39 within which is a driving mechanism (not shown) for connecting an electric motor 40 to a drill chuck 37 depending from a drill head 38.

In order to conserve metal, the bracket 20 has a reduced thickness central web 21.

Operation

In operation, when it is desired to use the universally locating drill press herein disclosed, the handles 17 and 34 will first be unlocked by swinging them in a counter-clockwise direction. The drill head 38 will then be swung to the proper position by rotating the swivel bracket 20 with respect to the column 11. The handles 17, 34 will then be manually twisted clockwise to lock the drill head 38 in adjusted position. The drill will then be lowered to bring it into engagement with the work which is located upon the base 10.

One advantage of the present invention is that it is not necessary to move the work upon the base 10. On the contrary, the drill itself may be moved universally to any desired position. This will permit the operator to set up any number of jigs and fixtures on a bench or die plate and then swing the drill into position above the work. The locking handles will then be tightened to clamp the swivel bracket and drill head in the proper operating position.

While there has been disclosed in this specification one form in which the invention may be embodied in practice, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent is:

In a universal centering drill press, a base, a vertical column extending upwardly from said base and having a reduced upper end, a pair of anti-friction bearings mounted upon said reduced upper end and spaced apart by a collar which embraces said reduced upper end, a swivel bracket having a vertical aperture surrounding said bearings and said collar, a washer plate on the top of said bracket covering said aperture, a handle having a hub engaging said washer plate and having a threaded shaft extending into a tapped hole in said reduced upper end for clamping said swivel bracket tightly upon said column, the other end of said swivel head having a second vertical aperture within which a depending drill head column is swiveled, a pair of anti-friction bearings located in said second aperture and spaced apart by a second collar, a second washer plate under said second aperture, and a second handle connected to said drill head column for clamping said drill head column upon said swivel bracket.

MICHAEL P. BUDNEY.

REFERENCES CITED

The following references are of record in the file of this patent:

UNITED STATES PATENTS

| Number | Name | Date |
| --- | --- | --- |
| 1,771,035 | Feister | July 22, 1930 |
| 2,312,356 | Oceanasek | Mar. 2, 1943 |
| 2,586,120 | Templeton | Feb. 19, 1952 |

FOREIGN PATENTS

| Number | Country | Date |
| --- | --- | --- |
| 2,760 | Great Britain | Feb. 8, 1895 |